US010662340B2

United States Patent
Lefevre et al.

(10) Patent No.: US 10,662,340 B2
(45) Date of Patent: May 26, 2020

(54) LIQUID CONCENTRATE OF SOLID PARTICLES OF HYBRID PIGMENTS CONTAINING GRAFTED COPOLYMERS AND USE OF SAME FOR PREPARING PAINTS IN AN AQUEOUS AND/OR ORGANIC MEDIUM

(71) Applicant: COLORIS GLOBAL COLORING CONCEPT, Villeneuve-Loubet (FR)

(72) Inventors: Daniel Lefevre, Aubagne (FR); Michel Dufour, Mougins (FR)

(73) Assignee: COLORIS GLOBAL COLORING CONCEPT, Villeneuve-Loubet (FR)

( * ) Notice: Subject to any disclaimer, the term of this patent is extended or adjusted under 35 U.S.C. 154(b) by 89 days.

(21) Appl. No.: 15/779,979

(22) PCT Filed: Aug. 9, 2016

(86) PCT No.: PCT/FR2016/052056
§ 371 (c)(1),
(2) Date: May 30, 2018

(87) PCT Pub. No.: WO2017/098095
PCT Pub. Date: Jun. 15, 2017

(65) Prior Publication Data
US 2018/0355192 A1    Dec. 13, 2018

(30) Foreign Application Priority Data

Dec. 11, 2015 (FR) .................................. 15 62188

(51) Int. Cl.
| | | |
|---|---|---|
| C09D 7/41 | (2018.01) | |
| C09B 67/00 | (2006.01) | |
| C09B 67/22 | (2006.01) | |
| C09B 67/40 | (2006.01) | |
| C08F 290/06 | (2006.01) | |
| C08F 220/18 | (2006.01) | |
| C09D 133/14 | (2006.01) | |
| C09D 151/00 | (2006.01) | |
| C09D 7/45 | (2018.01) | |
| C08F 212/08 | (2006.01) | |
| C08F 226/06 | (2006.01) | |

(52) U.S. Cl.
CPC .............. *C09D 7/41* (2018.01); *C08F 220/18* (2013.01); *C08F 290/061* (2013.01); *C08F 290/062* (2013.01); *C09B 67/0033* (2013.01); *C09B 67/0082* (2013.01); *C09B 68/41* (2013.01); *C09D 7/45* (2018.01); *C09D 133/14* (2013.01); *C09D 151/00* (2013.01); *C08F 212/08* (2013.01); *C08F 226/06* (2013.01); *C08F 2500/02* (2013.01)

(58) Field of Classification Search
CPC ..... C09D 7/45; C09D 151/00; C08F 290/061; C08F 220/18; C08F 290/062; C08F 212/08; C09B 67/0033
USPC ....................................................... 524/406
See application file for complete search history.

(56) References Cited

U.S. PATENT DOCUMENTS

2004/0011254 A1* 1/2004 Chianelli ................. C09D 7/70
106/487
2004/0106715 A1* 6/2004 Legrand .............. C08F 290/046
524/425

FOREIGN PATENT DOCUMENTS

| WO | 97/28200 | 8/1997 |
| WO | 02/081581 A1 | 10/2002 |
| WO | 2008/097837 A2 | 8/2008 |
| WO | 2009/092104 A1 | 7/2009 |
| WO | 2009/112646 A1 | 9/2009 |
| WO | 2009/114541 A2 | 9/2009 |

OTHER PUBLICATIONS

International Search Report, dated Oct. 14, 2016, corresponding to Application PCT/FR2016/052056.

* cited by examiner

*Primary Examiner* — Doris L Lee
(74) *Attorney, Agent, or Firm* — Ladas & Parry LLP; Malcolm J. MacDonald

(57) ABSTRACT

A liquid concentrate of pigments of mineral and organic hybrid solid particles of 0.5 to 2 μm, including a copolymer consisting of:
- 5 to 40 wt % of anchor sequence(s) consisting of a linear copolymer formed from a first monomer with a basic nitrogenous group added from compound(s) selected from vinylpyridines, and a second monomer of the anchor sequence consists of an ethylene monomer containing an aromatic group, the weight content of the first monomer relative to the second monomer being 40-60 wt %,
- 25 to 90 wt % of the hydrophobic sequence(s) obtained from a polymer-substituted ethylene macromonomer of which the monomer units contain —COOR$_{10}$ groups, where R$_{10}$ is an optionally substituted C1-C10 alkyl, and
- 5 to 70 wt % of hydrophilic sequence(s) obtained from an ethylene macromonomer substituted by a hydrophilic sequence comprising a polyethylene glycol sequence substituted by a terminal alkoxy group, or connected to a polypropylene glycol sequence.

22 Claims, No Drawings

LIQUID CONCENTRATE OF SOLID PARTICLES OF HYBRID PIGMENTS CONTAINING GRAFTED COPOLYMERS AND USE OF SAME FOR PREPARING PAINTS IN AN AQUEOUS AND/OR ORGANIC MEDIUM

The invention relates to concentrates of pigment dyes consisting of hybrid pigments comprising mineral particles complexed with organic dye pigments or molecules called "hybrid pigments". Said concentrates comprise grafted copolymers which are called "universal", i.e., which can be mixed with or are compatible with both organic and aqueous solvent media, said copolymer comprising at least three sequences of different chemical nature, among which at least one solid-particle anchor sequence consisting of mineral fillers, at least one hydrophobic sequence and at least one hydrophilic sequence.

The term "hydrophilic sequence" or "hydrophobic sequence" as used herein is intended to mean that said sequence is more hydrophilic or more hydrophobic, respectively, than the other two said sequences.

The invention also relates to a process for preparing paint, ink or liquid coatings using said liquid concentrates of said mineral filler particles.

In said liquid concentrates of pigment dyes, said copolymers are used as dispersant and/or wetting agent and/or stabilizer for solid particles and/or emulsifier and/or compatibilizer in an aqueous and/or organic medium, for the preparation of paints or inks in aqueous and/or organic medium.

Once manufactured, the pigment dyes used are in the form of aggregates or agglomerates. Their incorporation in a liquid, in order to obtain a stable suspension, therefore requires a prior dispersion step during which these assemblies are dissociated into elementary particles under the effect of high mechanical stresses. However, the action of these mechanical forces would not be efficient if no dispersing agent is present.

The invention relates to universal or multi-compatible concentrates (in aqueous media or various solvents) of pigment dyes consisting of both mineral and organic hybrid solid particles of intermediate sizes of 0.5 to 2 µm containing specific grafted copolymers.

These concentrates must have a high pigment concentration and a rheology suited to their use in the automated proportioning process performed at the factory and at the point of sale.

The invention also relates to a process for preparing paints, inks, liquid coatings and liquid plastics using said concentrates of large particles.

Such "universal" copolymers were described in patent WO 97/28200 in concentrates of conventional mineral or organic dye pigments of sizes lower than 0.5 µm in order to prepare paints in aqueous medium or solvent medium.

These grafted copolymers are thus used as dispersants and/or stabilizers for solid particles and/or emulsifier in an aqueous and/or organic medium, and/or compatibilizer in an aqueous and/or organic medium.

As dispersant for solid particles in an aqueous and/or organic medium, the copolymers facilitate and supplement mechanical dispersion by proper wetting of the particles by the continuous phase and by removing the air film which surrounds them.

These copolymers play a part in each dispersion step. First, they ensure proper wetting of the particle by the continuous phase by replacing the air film surrounding the surface of the solid by molecules of liquid. Next, they substantially improve the yield of the dissolver/grinder during the phase of deagglomeration of the agglomerates.

To be efficient, a copolymer useful as dispersant must therefore comprise an anchor sequence, having a good affinity for the particle surface, and one or more sequence(s) compatible with the continuous phase in which these solids are incorporated. If one of these components is missing, or in the event of desorption of the dispersant, the system flocculates, a phenomenon expressed as re-agglomeration of the particles and an increase in viscosity of the dispersion. In the particular case of a paint, poor dispersion of the mineral fillers within the binder results in rapid sedimentation of the filler agglomerates in the paint with an increase in its viscosity. In addition, the opacity and covering capacity of the paint is seen to drop, with reduced surface gloss and durability of the paint film.

As stabilizing agent for solid particles in an aqueous and/or organic medium, the copolymers are adsorbed on the surface of the solid and coat the particles, forming a layer of solvated copolymers responsible for steric repulsion forces and, in the case of polyelectrolytes in aqueous medium, electrostatic repulsion forces, which counter van der Waals attractive forces, thereby ensuring the stability of the dispersion. The anchor sequence therefore needs to be strongly adsorbed on the surface of the solid particle, for example by van der Waals bonds, and one of the other two sequences, respectively hydrophilic and hydrophobic, must be developed to create steric and/or electrostatic repulsion forces depending on the medium being used.

As emulsifier in an aqueous and/or organic medium, when the continuous phase of a dispersion of solid particles is immiscible with the continuous phase of the paint to which it is added, the copolymers facilitate and supplement the mechanical emulsification of the continuous phase of the former in the latter. The emulsifying effect of the copolymer develops as soon as the copolymer has sufficiently long and numerous hydrophilic and hydrophobic sequences so that they can each be deployed within their respective affinity medium, water/organic solvent. The anchor sequence plays a very small role in the emulsifying effect.

As compatibilizer for preparing the dispersion of solid particles in an aqueous and/or organic medium in relation to other components of the paint. The compatibilizing effect of the copolymer is optimized if the conditions of the stabilizing effect and of the emulsifying effect are met.

The plurality of chemical functions within the same copolymer, and the possibility of formulating dispersions of solid particles without elongation resin and/or without surfactant, improve compatibility with resins, thus allowing formulation of paints from a wide range of binders in aqueous and/or organic phase.

These copolymers contain a sequence enabling them to anchor on solid particles, and at least two sequences of hydrophilic/water-soluble and hydrophobic/organosoluble nature, respectively, allowing their use in compositions in aqueous and/or organic medium. The presence of an insoluble sequence in selective medium surprisingly increases the amount of dispersant adsorbed on the surface of the particles, thereby avoiding the phenomenon of flocculation when the different pigments are mixed.

The anchor sequences are preferably prepared by radical copolymerization of monomers comprising ethylene monomers bearing basic nitrogenous groups, these nitrogenous monomers being distributed along the chain in a statistical manner.

In WO97/28200, it was proposed as anchor sequence to copolymerize the above-mentioned nitrogenous monomers with one or more neutral unsaturated ethylene monomer(s). When the desire is to modify certain properties, such as glass transition temperature, stability or mechanical properties. However, in the specific preferred exemplary embodiments, the anchor sequences contain only ethylene monomers comprising nitrogenous groups, to the exclusion of any other monomer.

In WO97/28200, the preferred grafted copolymers were specially developed to produce liquid concentrates of conventional pigment dyes, either mineral or organic, of small sizes (lower than 0.5 µm) and comprise:
- a main solid-particle anchor chain comprising dialkylaminoethyl (meth)acrylate, 2-vinylpyridine, 4-vinylpyridine, N,N-dimethylacrylamide groups, alone or in mixture,
- one or more hydrophilic grafts of poly(ethylene oxide) methacrylate, and
- one or more hydrophobic grafts containing alkyl (meth) acrylates, vinyl esters alone or copolymerized with styrene and alkylstyrene derivatives, fluorinated monomers (trifluoroethyl methacrylate), or 3-(trimethoxysilyl)propyl methacrylate.

WO02/081581 described liquid concentrates of thickening and opacifying colourless mineral fillers of type carbonate, silicate, sulphate and silicas comprising specific copolymers for such thickening colourless mineral fillers, used in paints, which are suitable for modular manufacture of paint, i.e., with dry extracts of said colourless mineral fillers representing a weight content of 65 wt % or higher of the liquid concentrate. Said colourless mineral fillers in a paint are the main component together with the binder; they provide a thick structure which is microporous and opaque, and impart a specific matt, satin or gloss surface condition to the paint. And a paint must preferably contain at least 45 to 50% dry extract of these colourless mineral fillers.

In addition to the particular crystallographic structures and chemical natural of the mineral compounds concerned, these colourless mineral fillers are of large sizes greater than 2 µm and are distinguished from the mineral dye pigments used for colouring paints which are smaller than 0.5 µm.

WO 02/081581 defines a restricted family of grafted copolymers described in the first patent which are advantageous for the preparation of liquid concentrates of fillers having a dry extract of 65 wt % or higher useful for the manufacture of paints by assembly of said concentrates.

The conventional applications described in these two patents thus consist in dispersing either (a) pigments having a mean equivalent diameter ranging of 20 to 500 nm for dyes or (b) fibrous fillers or solids having a mean equivalent diameter higher than 2 µm for concentrates of fibrous fillers or solids. The grafted copolymers used in these two types of applications are characterized by their chemical structure and their range of molecular masses. They are distinguished from each other by the nature and number of the chemical groups of the main anchor chain, the number, nature and length of the hydrophilic chains and the number, nature and length of the hydrophobic chains.

The hybrid particles according to the present invention, the mean size of which is intermediate between 500 nm (0.5 µm) and 2 µm, required a suitable choice of grafted copolymers in order to prepare concentrates of particles optimized for their multi-compatibility, their high concentration, their storage stability and their rheology.

The hybrid or composite pigment particles useful in liquid or castable formulations such as paints, coatings, plastics and inks which are in the range of mean diameters from 500 nm to 2 µm according to the present invention comprise more particularly:
- natural pigments of mixed mineral and organic plant origin known by the name "Mayan pigments" as described in WO2008097837, WO2009092104, WO2009112646 and WO2009114541 among others, as well as
- particles of complexes of infrared (IR)-radiation-reflecting pigments complexed with conventional chemical organic dye pigments of small sizes.

The complexation of organic dye pigments and IR-reflecting pigments results from their chemical structure and particularly from the high concentration of OH groups on their surface.

The natural pigments of mixed mineral and organic plant origin known by the name "Mayan pigments" consist of mineral particles having a hollow or porous structure, in particular in the form of hollow fibres filled with the organic dye pigments of plant origin. Clay mineral particles in the form of hollow fibres of 1 to 2 µm called sepiolite are known in particular. The walls of the hollow mineral particle form a protective shell with respect to the organic dye pigments contained therein.

The IR-reflecting pigments have the property of decreasing the heating of sunlight-exposed surfaces when said surfaces are coated with said paint containing said IR-reflecting pigments. On the other hand, because of their slightly opacifying nature, they do not affect the colour of the colouring pigment to which they are complexed according to the present invention. IR-reflective particles of titanium oxide in crystalline form, so-called rutile, are known in particular.

These hybrid solid particles are difficult to use by direct addition of the powder in the formulation. They must therefore be pre-dispersed in the form of fluid pastes. The commercial polymers, wetting agents and dispersants do not make it possible to find an acceptable compromise for these solid particles. It is indeed necessary to succeed in combining the four following performance characteristics:
- a concentration of solid particles at least equal to 40 vol %,
- a rheology allowing the handling of the fluid paste during the various transfers (pouring, agitation in tanks, pumping, measuring, mixing with other fluids),
- a good storage stability (absence of settling and of syneresis after several months regardless of temperature) and
- a good compatibility with the chemical media of the final application (water/solvent, chemical nature of the components, binders, surfactants, etc.).

In WO 02081581 the grafted copolymer comprising at least three sequences of different chemical nature, consisting of:
1/ 5 to 40 wt %, preferably 15 to 35 wt %, more preferably 20 to 30 wt % of said anchor sequence(s) consisting of a linear copolymer formed from at least two different monomer units comprising:
- a first ethylene monomer unit comprising at least one basic nitrogenous group preferably selected from —$NH_2$, —NH—, —NHR, —$NR_2$, —$CONH_2$, —CONHR, R representing a C1-C6 alkyl radical, and from heterocyclic groups of type pyridine,
- a second unsaturated ethylene monomer unit comprising an aromatic group, preferably a phenyl, the weight content of said first monomer units relative to said second monomer units being from 40 to 60 wt %, preferably about 50 wt %.

2/ 25 to 90 wt %, preferably 40 to 80 wt %, more preferably 50 to 70 wt % of said hydrophobic sequence(s) comprising an organosoluble polymer, and 3/ 5 to 70 wt %, preferably 15 to 30 wt %, more preferably 10 to 20 wt % of said hydrophilic sequence(s) comprising an organosoluble polymer.

In WO 02081581 the grafted copolymer contains an anchor sequence comprising:

a.1.—said first monomers with basic nitrogenous groups added from one or more compound(s) selected from the vinylpyridines and preferably aminoalkyl(meth)acrylate of following formula I:

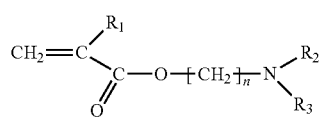

where $R_1$ is a hydrogen atom or a (C1-C4) alkyl radical; $R_2$ and $R_3$, which may be identical or different, are each a hydrogen or a (C1-C4) alkyl radical, n=0 to 6, and a.2.—Said second monomer of the anchor sequence consists of a monomer of following formula II:

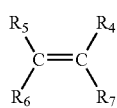

wherein:
$R_4$, $R_5$, $R_6$ are identical or different and are each a hydrogen or a C1-C4 alkyl radical, preferably a hydrogen, $R_7$ represents an aromatic group, in particular a phenyl group which is optionally substituted, in particular by a C1-C4 alkyl radical.

Said first monomer may in particular be an aminoalkyl methacrylate or a vinylpyridine.

Said second monomer may in particular be a styrene or alkylstyrene such as α and methylstyrene or tert-butylstyrene.

More particularly, in said anchor sequence, said first monomer is 2-dimethylaminoethyl methacrylate monomer (DMAEMA) and said second monomer is styrene.

The hydrophobic sequence(s) is/are selected so that their solubility properties are complementary to those of the hydrophilic sequence(s) mentioned below, in order to impart to the bi-grafted copolymer its universal dispersant nature with respect to solvents and binders.

In WO 02081581, said preferred hydrophobic sequence is obtained from a macromonomer of following formula (III):

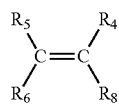

wherein:
$R_4$, $R_5$, $R_6$ are identical or different and are each a hydrogen or a C1-C4 alkyl radical, preferably a hydrogen, and $R_8$ represents $COOR_{10}$, with $R_{10}$ which is a C1-C10 alkyl, preferably substituted by a C4-C8 alkyl radical.

More particularly still, said hydrophobic macromer is an ethylhexyl methacrylate (EHMA).

In WO 02081581, said hydrophilic sequence is obtained from a macromonomer of following formula (IV):

$R_4$, $R_5$, $R_6$ are identical or different and are each a hydrogen or a C1-C4 alkyl radical, preferably a hydrogen, $R_9$ is a hydrophilic sequence consisting of a polymer of which the hydrophilic monomer units will be preferably selected from:
ethylene oxide,
the (meth)acrylic acids, maleic acid, fumaric acid, itaconic acid, Preferably still, in formula (IV) above, $R_9$ is polyethylene glycol and the macromonomer IV is polyethylene glycol methacrylate.

More particularly, in WO 02081581, the grafted copolymers of the invention are prepared via radical pathway ("macromonomer" technique), from macromonomers such as: poly(ethyleneglycol) (meth)acrylates preferably having a molecular weight of 500 or higher, such as HEMA-10, marketed by Bimax Chemicals Ltd.

The specific grafted copolymers used for the formulations of pigment concentrates of WO 9728200 or for the formulations of concentrates of fillers and fibrous solid of WO 02081581 described above do not make it possible to obtain the compromise sought for the hybrid pigments according to the present invention. If the concentration is sufficient (greater than or equal to 40 wt %), either the rheology is not suitable (viscosities too high) for satisfactory handling or the stability is quite inadequate (settling and syneresis in a few days). If the rheology and the stability are acceptable, the concentration of the fluid paste (lower than 25 vol %) is quite inadequate. In this case, to add the necessary amount of active particles to the formulation, it would be necessary to add a large proportion of fluid paste and thus a large amount of foreign substances (water, solvents, wetting agents, dispersants, stabilizers, etc.) to the formulations of paints, inks, liquid coatings and liquid plastics, which would harm their usage properties.

The goal of the present invention is thus to provide a liquid concentrate of hybrid solid pigment particles, comprising universal copolymers having the properties listed above in solvent or aqueous medium, and having a high content of pigment dry extracts, in particular a filler dry extract content of 40 wt % or higher, while being stable and compatible with the other components of paints, so as to be able to directly prepare paints coloured with these pigment concentrates.

It is indeed advantageous to be able to prepare paints with liquid pigment concentrate modules, which can therefore be stored in tanks, pumped, automatically measured out and easily mixed to make the manufacture of a paint fast and economical. This enables a reduction in the production times of paints, as well as the carrying costs of raw materials, in number and in quantity, as well as the costs of producing and of formulating paints. And, this also makes it possible to increase paint diversity and to make the production and the production automation of coloured paints more flexible.

These pigment concentrates must be liquid to be able to be stored, pumped and measured out by means of conventional equipment available in the paint industry. The term "liquid" as used herein is intended to mean a fluid whose rheological characteristics measured at 20° C. are as follows:

flow threshold lower than 15 N/m², and
viscosity at 500 s⁻¹, lower than 40 Pa·s.

These pigment concentrates must be stable to remain homogeneous during transport and storage: neither settling nor syneresis should be observed when they are not provided with temporary agitation. And, flocculation of the solid particles in contact with the other components of the paint should not be observed during incorporation in the paint formula.

The problem posed by the present invention is thus to develop specific copolymers responding to these additional properties allowing the preparation of a concentrate of mineral and organic hybrid pigments of 0.5 to 2 μm having the copolymer properties previously sought (dispersion, stabilization, emulsification).

It arises from the tests carried out by the inventors that it is difficult to obtain a copolymer which responds to all the properties sought according to the objectives of the present invention.

In particular, it is likely that the hybrid nature of the particles interferes with chemical affinity and absorption between the anchor sequence of the polymers and said solid particles in terms of hydrogen bonds and/or polar bonds.

It was discovered according to the present invention that the various objectives of the present invention are achieved with a liquid pigment concentrate of mineral and organic hybrid particles containing grafted copolymers containing specific hydrophilic sequences containing poly propylene glycol sequences, in particular said hydrophilic sequence is obtained from a macromonomer of following formula (IV):

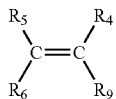
(IV)

$R_4$, $R_5$, $R_6$ are identical or different and are each a hydrogen or a C1-C4 alkyl radical, preferably a hydrogen, and $R_9$ comprises a substituted polyethylene glycol or polypropylene glycol sequence as defined below.

The term "size of 0.5 to 2 μm" as used herein is intended to mean that the median diameter of the particle-size distribution of said particles is on average from 0.5 to 2 μm.

More precisely, the object of the present invention is a liquid concentrate of pigments of mineral and organic hybrid solid particles of 0.5 to 2 μm, preferably with at least a relative weight proportion of organic molecules of dyes in said pigments of hybrid solid particles of 1 to 45 wt %, useful for the manufacture of paints comprising an aqueous or organic solvent, comprising a grafted copolymer containing at least three sequences of different chemical nature, among which at least one anchor sequence capable of being absorbed on solid particles, at least one hydrophobic sequence and at least one hydrophilic sequence, characterized in that it comprises a said copolymer consisting of:

1/5 to 40 wt %, preferably 15 to 35 wt %, more preferably 20 to 30 wt % of said anchor sequence(s) consisting of a linear copolymer formed from at least two different monomer units comprising:

a/ a first monomer with at least one basic nitrogenous group added from one or more compound(s) selected from the vinylpyridines and preferably aminoalkyl(meth)acrylate of following formula I:

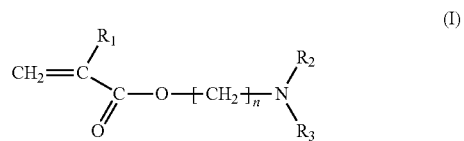
(I)

where $R_1$ is a hydrogen atom or a (C1-C4) alkyl radical; $R_2$ and $R_3$, which may be identical or different, are each a hydrogen or a (C1-C4) alkyl radical, n=0 to 6, and b/ a second monomer of the anchor sequence consists of a monomer of following formula II:

(II)

wherein:

$R_4$, $R_5$, $R_6$ are identical or different and are each a hydrogen or a C1-C4 alkyl radical, preferably a hydrogen, $R_7$ is an aromatic group comprising an optionally substituted phenyl group, the weight content of said first monomer relative to said second monomer being from 40 to 60 wt %, preferably about 50 wt %, and 2/ 25 to 90 wt %, preferably 40 to 80 wt %, more preferably 50 to 70 wt % of said hydrophobic sequence(s) obtained from a macromonomer of following formula (III):

(III)

wherein:

$R_4$, $R_5$, $R_6$ are identical or different and are each a hydrogen or a C1-C4 alkyl radical, and $R_8$ consists of a polymer whose monomer units contain —$COOR_{10}$ groups in which $R_{10}$ is an optionally substituted C1-C10 alkyl, preferably a C2-C8 alkyl optionally hydroxyl-substituted, and 3/ 5 to 70 wt %, preferably 15 to 30 wt %, more preferably 10 to 20 wt % of hydrophilic sequence(s) obtained from a macromonomer of following formula (IV):

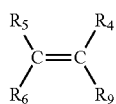

(IV)

R$_4$, R$_5$, R$_6$ are identical or different and are each a hydrogen or a C1-C4 alkyl radical, and R$_9$ is a hydrophilic sequence comprising a polyethylene glycol sequence (a) substituted by a terminal alkoxy group or (b) connected to a polypropylene glycol sequence.

In a first embodiment, said hybrid solid particles comprise mineral particles having a hollow or porous structure, filled with organic dye pigments, preferably with at least a relative weight proportion of organic dye pigments in said pigments of hybrid solid particles of 1. to 30 wt %.

More particularly, said hybrid particles comprise clay mineral particles in the form of hollow fibres called sepiolite inside which fibres of organic dye pigments of plant origin are added.

In a second embodiment, said hybrid particles comprise particles of complexes of infrared (IR)-radiation-reflecting pigments complexed with organic molecules of dyes preferably with at least a relative weight proportion of organic dye molecules in said pigments of hybrid solid particles of 1.5. to 15 wt %.

More particularly, said particles of complexes of infrared (IR)-radiation-reflecting pigments comprise white metallic oxides, preferably the titanium dioxide of crystalline form known as rutile, or black metallic oxides, preferably chromium oxide.

More particularly, in the hydrophilic sequence of the copolymer of the invention is obtained from a macromonomer of polypropylene glycol-ethylene glycol methacrylate R$_9$ being a polypropylene glycol sequence substituted by a terminal polyethylene glycol sequence preferably having a molecular weight of 500 or higher.

More particularly still, said hydrophilic sequence of the copolymer of the invention is obtained from a macromonomer of methoxypoly ethylene glycol methacrylate, R$_9$ being a hydrophilic sequence comprising a polyethylene glycol sequence substituted by a terminal methoxy group, preferably having a molecular weight of 500 or higher.

More particularly still, in said anchor sequence of the copolymer of the invention, said first monomer is 2-dimethylaminoethyl methacrylate monomer and said second monomer is styrene.

More particularly, said hydrophobic sequence of the copolymer of the invention is obtained in a novel manner from a macromonomer of formula (III) which is a polymer of ethylhexyl methacrylate (EHMA) units.

More particularly still, the molecular weight of the grafted copolymer of the invention is between 5,000 and 25,000, preferably between 10,000 and 20,000.

More particularly still, said copolymer of the invention comprises:
- a said hydrophilic sequence obtained from a macromonomer of polypropylene glycol-ethylene glycol methacrylate, or a methoxy polyethylene glycol methacrylate.
- a said anchor sequence obtained with a said first monomer which is 2-dimethylaminoethyl methacrylate monomer and said second monomer which is styrene; and
- a said hydrophobic sequence obtained from a macromonomer of ethylhexyl methacrylate (EHMA) polymer.

More particularly still, the liquid concentrate of pigments of hybrid solid particles of the invention comprises an aqueous solvent.

More particularly still, the liquid concentrate of pigments of hybrid solid particles of the invention comprises a dry extract of pigments of hybrid solid particles greater than or equal to 45%.

More particularly still, the liquid concentrate of pigments of hybrid solid particles of the invention comprises a weight content of the dry extract of said grafted copolymers is 10 to 30 wt % of said liquid concentrate.

The copolymer sequences of the invention as defined above make it possible to obtain liquid concentrates of pigments of hybrid solid particles with high dry extracts (at least 40 even 45%) while being stable and compatible with the other components of paints, in both solvent medium and aqueous medium, and this for the various fillers of pigments of hybrid solid particles.

The reasons why these copolymers as defined according to the present invention are particularly suited to the application sought according to the present invention are not fully elucidated by the inventors.

The synthesis of these grafted copolymers is based on the use of the "macromonomer" technique and/or grafting of functionalized telomers on a linear chain or preformed graft. They may therefore be prepared by radical copolymerization of one or more hydrophilic macromonomer(s) and of one or more hydrophobic macromonomer(s) with one or more nitrogenous comonomer(s).

These syntheses are performed in inert atmosphere in the presence of an appropriate solvent or mixture of solvents, i.e., in which the reagents, macromonomers, comonomers are completely soluble and the end products are completely or at least partially soluble. These solvents will be notably selected from aromatic hydrocarbons such as toluene or xylene; ethers such as dioxane or tetrahydrofuran; ketones such as acetone or methylethylketone; esters such as ethyl acetate or butyl acetate. Preferably dioxane or tetrahydrofuran are used for the preparation of grafted copolymers.

Synthesis begins by preparing the macromonomers, by telomerization then attachment of a chain-end double bond, step followed by copolymerization of said macromonomers with the comonomers.

The grafted copolymers of the invention can also be prepared by attaching one or more functionalized molecule (s), one of the two types of hydrophilic or hydrophobic grafts, even both graft types, to a preformed polymer using reactive monomers, this chain which may already contain one or more hydrophilic or hydrophobic graft(s) incorporated via radical pathway. In this case, the reaction process requires the use of at least two different reactors, the first being used to prepare the main chain, the second to prepare the telomer.

The grafting of these side chains onto the preformed polymer can then be achieved by adding to the first reactor the contents of the reactor(s) containing the telomers.

The grafted copolymers of the invention have, distributed along their anchor sequence, monomer units comprising basic nitrogenous groups, arranged in a statistical manner.

Said basic groups can be defined by their pKa, ranging between 2 and 14, preferably between 5 and 14, in particular between 5 and 12. Measurements of pKa are performed at 25° C. in water at 0.01 molar concentration.

The hydrophobic sequence(s) is/are selected so that their solubility properties are complementary to those of the hydrophilic sequence(s) mentioned below, in order to impart to the bi-grafted copolymer its universal dispersant nature with respect to solvents and binders.

The organosoluble polymers formed of monomer units having a solubility parameter of less than or equal to 21.5 $J^{1/2}/cm^{3/2}$, preferably of less than 19 $J^{1/2}/cm^{3/2}$, constitute said hydrophobic sequences and allow dispersal of the particles in nonpolar medium.

This/these sequence(s) or graft(s) can be incorporated in the copolymer by radical copolymerization of one or more organosoluble macromonomer(s) with one or more unsaturated ethylene comonomer(s) mentioned above in the description of the anchor sequence, namely one or more nitrogenous ethylene monomer(s), optionally one or more neutral unsaturated ethylene monomer(s) and at least one hydrophilic macromonomer described below (from the initiators usually used, for example organic peroxides, redox systems, or preferably azo compounds), and will lead to the formation of a bi-grafted copolymer.

These hydrophobic grafts can also be attached by radical copolymerization or by grafting on a linear or branched copolymer formed from one or more unsaturated or nitrogenous ethylene monomer(s) cited above in the description of the anchor sequence, and/or one or more hydrophilic macromonomer(s) described below.

Preferably, said hydrophobic sequences of the invention have a hydrophobicity such that the solubility parameter of the monomers of the hydrophobic sequence is less than 22.5 $J^{1/2}/cm^{3/2}$.

The solubility parameters, expressed in $J^{1/2}/cm^{3/2}$, were calculated by the increment method of Hoftyzer-van Krevelen or measured experimentally (for polydimethylsiloxane). The molar volumes needed for the calculation of solubility parameters are calculated from Fedors data. These calculation methods and experimental values are described in the work: D. W. van Krevelen, "Properties of polymers. Their correlation with chemical structure; their numerical estimation and prediction from additive group contributions", Third edition, Elsevier, 1990, p. 189-225.

The hydrophilic sequence(s), statistically distributed along the main chain of the copolymer, account for the water-solubility of the copolymers. It is these sequences which stabilize the dispersions of particles in aqueous medium. The solubility parameter of the monomer units forming these hydrophilic grafts is greater than or equal to 22 $J^{1/2}/cm^{312}$, preferably greater than 22.5 $J^{1/2}/cm^{3/2}$.

These side chains can be added to the copolymer by using one or more hydrophilic macromonomer(s). A macromonomer of this type is made up of a water-soluble polymer.

The copolymerization of one or more of these hydrophilic macromonomer(s) with one or more unsaturated ethylene comonomer(s) mentioned above in the description of the anchor sequence, namely one or more compound(s) a) one or more neutral unsaturated ethylene monomer(s), and at least one hydrophobic macromonomer described above (from the initiators usually used, for example organic peroxides, redox systems, or preferably azo compounds) will lead to the formation of a bi-grafted copolymer according to the invention.

These hydrophilic grafts can also be attached by radical copolymerization or grafting on a linear or branched copolymer formed from one or more unsaturated or nitrogenous ethylene monomer(s) cited above in the description of the anchor sequence.

As previously mentioned, in a grafted copolymer of the invention, the hydrophilic sequence has a chemical nature different from said hydrophobic sequence as well as from said anchor sequence on the one hand, and on the other hand, the hydrophilicity of the hydrophilic sequence is higher than that of said hydrophobic and anchor sequences.

Preferably, said hydrophilic sequences have a hydrophilicity such that the solubility parameter of the monomers of the hydrophilic sequence is higher than 22.5 $J^{1/2}/cm^{3/2}$, more preferably higher than 24 $J^{1/2}/cm^{3/2}$.

Advantageously, the molecular weight of the grafted copolymer is between 5,000 and 25,000, preferably between 10,000 and 20,000.

Said copolymers can be prepared by radical copolymerization from macromonomers and/or by grafting of functionalized polymers onto a preformed chain, and for this reason have a well-controlled structure.

This synthesis method also offers the possibility of adjusting the molecular weight of the anchor sequence, in order to increase the adsorption rate of the copolymers on the particles, both mineral and organic, and that of the side chains, by improving their compatibility with the continuous phase.

Thus, by using the grafted copolymers of the invention to prepare pigment concentrates, a dispersion state is achieved which is greater than the one obtained with dispersants of the prior art. Also, the high molecular weight of the products of the invention allows the preparation of pigment concentrates without any elongation resin.

Radical copolymerization is preferably carried out at a temperature between 50° C. and 140° C., and the grafting reaction at a temperature preferably between 20° C. and 150° C.

Advantageously, the order in which the monomers are added during radical copolymerization is as follows:
the macromonomers, which have high molecular weight and are therefore less reactive, are added first to the reactor, with the solvent;
the comonomer(s) forming the main chain, which are more reactive, are added continuously over time so that their concentration always remains low relative to the concentration of macromonomers.

According to a first variant, a process for preparing a grafted copolymer as defined above comprising at least three sequences of different chemical nature, among which a solid-particle anchor sequence, one or more hydrophobic sequence(s) and one or more hydrophilic sequence(s), in which the main chain is a solid-particle anchor sequence, characterized in that radical copolymerization is carried out on:

i) said first monomer(s) containing at least one basic nitrogenous group, in particular monomers of formula I above, and said second monomers containing an aromatic group, in particular monomers of formula II above ii) hydrophobic macromonomers represented by formula III:

(III)

where $R_4$, $R_5$, $R_6$, and $R_8$ have the meanings given above.

iii) said hydrophilic macromonomers represented by formula IV:

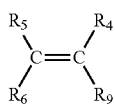

(IV)

where $R_4$, $R_5$, $R_6$ and $R_9$ are as defined above.

The invention also relates to said copolymer in the form of one of its salts, obtained by quaternization or neutralization of basic functions.

It is recalled here that the term "liquid concentrate" is intended to mean a fluid whose rheological characteristics measured at 20° C. are as follows:

flow threshold lower than 15 N/m², and
viscosity at 500 s$^{-1}$ lower than 40 Pa·s.

The concentrate formulation of the invention makes it possible to reduce:

the production times of paints to a few minutes,
the carrying cost of raw materials (number and amount), and
the costs of paint production and formulation, and to increase paint diversity and creativity (new paints) and production flexibility, and finally automation of paint production.

Another object of the present invention is a process for preparing paint using a liquid concentrate according to the invention, which is mixed with the other paint components, such as dyes, binders in organic or aqueous medium, and other additives in particular drying agents or bactericidal agents, antifoam agents as explained Example 3.

Other features and advantages of the present invention will become apparent in the light of the detailed exemplary embodiments given below.

EXAMPLE 1: PREPARATION OF COPOLYMERS

A) The Copolymers

The copolymers have a "comb" structure whose main chain is the solid-particle anchor sequence and the side chains consist of hydrophobic and hydrophilic sequences. According to the nature of the particles to which the copolymer will be attached, the hydrophilic and/or hydrophobic sequences may alternatively also be anchor sequences.

The anchor sequence: consists of amino acrylic monomers (e.g., DMAEMA) or non-amino acrylic monomers (methacrylic acid) and/or vinyl aromatic monomers (e.g., styrene or 2-vinylpyridine).

The hydrophobic sequence is obtained from the ethylhexyl methacrylate polymer macromer having molar mass 1000 to 3000, polydispersity index 1.3 to 1.5, structure: CH$_3$—(CH$_2$)$_3$—CH(C$_2$H$_5$)—CH$_2$—O—CO—C(CH$_3$)=CH$_2$.

The hydrophilic sequences are obtained from HEMA 10, PPGEGMA 750, PPGMA, CLA and MPEGMA macromers.

3a) PPGEGMA 750—Poly-propyleneglycol-ethyleneglycol-methacrylate

Structure:

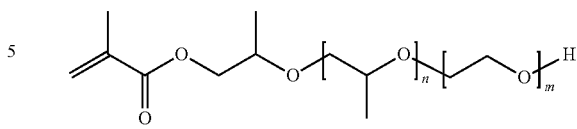

PPGEGMA is the ester of methacrylic acid esterified with n units of propylene glycol and m units of ethylene glycol.

PPGEGMA 750, having a weight average molar mass of about 750 g/mole, corresponds to n=2 to 4 units of propylene glycol and m=8 to 10 units of ethylene glycol.

3b) PPGMA—Poly-propyleneglycol-methacrylate

Structure:

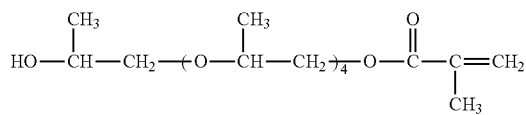

PPGMA is the mono methacrylate with n units of polypropylene glycol, in particular n=5 for a weight average molar mass of about 376 g/mole.

3c) CLA—Caprolactone acrylate

Structure:

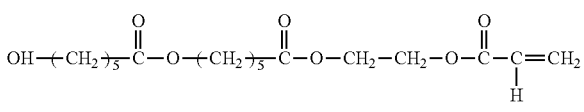

CLA is caprolactone acrylate. Its weight average molar mass is about 344 g/mole.

3d) MPEGMA—Methoxy Polyethylene glycol mono methacrylate

Structure:

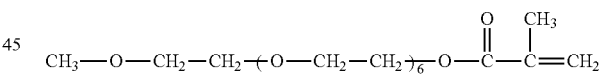

MPEGMA 550 is the mono methacrylate with n=6 units of ethylene glycol. Its weight average molar mass is about 550 g/mole.

3e) HEMA 10=Methacrylate of Polyethylene glycol (or hydroxy poly ethoxy (10) methacrylate). Structure: OH—(—CH$_2$—CH$_2$—O)$_n$—CO—C(CH$_3$)=CH$_2$ with n=10.

Its weight average molar mass when n=10 is about 600 g/mole.

In Table 1, the information provided corresponds to the relative weight proportions of the various components.

TABLE 1

| Copolymers | Composition | 1 | 2 | 3 | 4 | 5 | 6 |
|---|---|---|---|---|---|---|---|
| Anchor sequence | Methacrylic acid | | | 20 | 20 | | |
| | Styrene | 20 | 20 | 20 | | 20 | 20 |
| | DMAEMA(1) | 20 | 20 | | 20 | 20 | 20 |
| | 2-Vinylpyridine | | | | | | |
| Hydrophobic | pEHMA 2000(2) macromer | 100 | | 100 | 100 | 100 | 100 |

TABLE 1-continued

| | | | | | | | |
|---|---|---|---|---|---|---|---|
| sequence | pEHMA 2700(3) macromer | | 100 | | | | |
| Hydrophilic sequence | HEMA-10 macromer | 22 | 22 | 22 | 22 | | |
| | PPGEGMA 750 macromer | | | | | 22 | |
| | PPGMA macromer | | | | | | 22 |
| | CLA macromer | | | | | | |
| | MPEGMA 550 macromer | | | | | | |
| Polymer characteristics | Molar mass | 14500 | 19200 | 12000 | 11000 | 15000 | 17300 |
| | Polydispersity index | 1.60 | 1.72 | 1.43 | 1.51 | 1.78 | 1.83 |

| Copolymers | Composition | 7 | 8 | 9 | 10 | 11 |
|---|---|---|---|---|---|---|
| Anchor sequence | Methacrylic acid | | | | 20 | |
| | Styrene | 20 | 20 | 20 | | |
| | DMAEMA(1) | 20 | 20 | 20 | | 20 |
| | 2-Vinylpyridine | | | | 20 | 20 |
| Hydrophobic sequence | pEHMA 2000(2) macromer | 100 | 100 | | 100 | 100 |
| | pEHMA 2700(3) macromer | | | 100 | | |
| Hydrophilic sequence | HEMA-10 macromer | | | | | |
| | PPGEGMA 750 macromer | | | | | |
| | PPGMA macromer | | | | | |
| | CLA macromer | 22 | | | | |
| | MPEGMA 550 macromer | | 22 | 22 | 22 | 22 |
| Polymer characteristics | Molar mass | 18700 | 14000 | 15500 | 11800 | 15500 |
| | Polydispersity index | 1.52 | 1.55 | 1.64 | 1.57 | 1.64 |

(1)DMAEMA: 2-dimethylaminoethyl methacrylate
(2)Molar mass: 2000, Polydispersity index 1.26
(3)Molar mass: 2700, Polydispersity index 1.45

B) Protocol:

The various components below are added to a tank, in semi-batch mode, so as to avoid composition drift due to the different reactivity of the various reagents. Copolymerization is carried out at 80° C.

The conditions are described below:*

When addition is completed, the reactor is left at 80° C. for about 5 hours to obtain total conversion.

The solution obtained, once cooled, has a clear appearance with no formation of gel.

The phase change of the copolymer obtained is achieved by adding it to the aqueous phase and exchange occurs by azeotropic distillation.

The final suspension of copolymer in aqueous phase is translucent after cooling.

Copolymer composition added to the tank:
Hydrophobic macromer: 438 g
Hydrophilic macromer: 237 g
Styrene: 54 g
DMAEMA: 54 g
Toluene: 748 g
NBMA: 17.3 g
NBMA: 17.3 g Copolymers no. 1, 2, 5, 6, 7, 8, 9, 10 and 11 comprise anchor sequences of the invention. In view of the comparative results of Example 3 below, copolymers no. 1, 2, 5, 6, 7, 8 and 9 comprise a preferred anchor sequence.

Among these, copolymers no. 1, 5, 6, 7 and 8 comprise a preferred hydrophobic sequence of the invention (EHMA 2000), and copolymers no. 5, 8, 9 and 10 a preferred hydrophilic sequence of the invention (PPGEGMA 750 and MPEGMA 550).

Other anchor sequences comprising only one of the two elements were tested but had unsatisfactory results in combination with the best hydrophilic sequences and hydrophobic sequences on the one hand and, on the other hand, other hydrophobic sequences, notably the PLMA macromer, were tested with the best anchor sequences and hydrophilic sequences were tested having poorer results, notably PPGMA and CLA of higher molecular weights.

EXAMPLE 2: PREPARATION OF PIGMENT CONCENTRATES

A) Protocol:

Aqueous liquid concentrates of particles of intermediate diameter are prepared by mixing the following components:
Water
Copolymer
Particles of intermediate diameter
Additives: antifoam, bactericides, rheology agents The procedure for fabricating concentrates of particles of intermediate diameter is the following:
1—Placing the water in a tank
2—Adding the amount of copolymer
3—Placing the tank under a variable-speed agitator with a dispersion disc suited to the size of the tank
4—Gradual addition of the particles of intermediate diameter under moderate agitation (500 to 800 rpm).

This first phase is defined as the coating phase for wetting the surface of the particles of intermediate diameter; the particles of intermediate diameter are not yet in the state of maximum dispersion (complete separation of the particles forming agglomerates of particles of intermediate diameter); a coating time of about 20 minutes to 40 minutes depending on the characteristics of the particles of intermediate diameter. A portion of the additives is also added during this coating phase.

5—The "grinding" operation is performed by increasing the dispersion speed to 1500 rpm with a high peripheral speed around 15 to 20 m/second. This grinding step is not a matter of grinding the elementary particles of the particles of intermediate diameter but of dispersing these particles contained in the agglomerates. The grinding time may vary from 20 minutes to 60 minutes depending on the nature of the particles of intermediate diameter, especially their particle size and their specific surface area. The second portion of additives can be added when grinding is completed.

6—The characteristics of the concentrate of particles of intermediate diameter are checked by measuring:
Dry extract
Rheological characteristics Stability
Compatibility Concentrates in solvent phase with paint thinner as solvent were also successfully prepared.

The characteristics of the particles of intermediate diameter used in the examples are explained below and in Table 2 below.

In Table 2 below, the following particles were used:

a—Particles no. 1 to 3: "Mayan"-type blue (no. 1), red (no. 2) and yellow (no. 3) hybrid pigments These particles are marketed by the company PIGM'AZUR (France) under the mark PIGM'ART. They consist of fine small hollow clay fibres like Sepiolite inside which coloured organic or mineral molecules of plant origin are added, namely in particular the colouring molecules selected from indigoids, anthraquinone dyes, flavonoids, azo dyes, melanins, tetrapyrrole dyes, nitrated dyes, nitroso dyes, polymethine dyes, di- or triphenylmethane dyes. The dye material is thus protected from the outside by the clay walls.

The following pigments below were used:

PIGM'ART BLUE containing indigo blue,

PIGM'ART RED containing anthraquinone hydroxyl derivatives, and

PIGM'ART YELLOW containing flavonoid derivatives.

The dimensions of the fine particles of small hollow fibres are:

average length of 1 μm to 2 μm, fibre diameter (width) of about 0.01 μm;

inner diameter and length of the internal tubular axial openings: 3.6 Å×10.6 Å.

b—Particles no. 4 and 5: solar IR-reflecting pigments complexed with coloured organic pigments.

Particles no. 4 comprise solar IR-reflecting white pigments based on rutile-type titanium dioxide $TiO_2$ of large size ALTIRIS® 800 of 800 nm. Particles no. 5 comprise solar IR-reflecting black pigments based on chromium oxide ALTIRIS® 550 pigment of 550 nm.

Particles no. 4=ALTIRIS® 800 complexed with a blue organic pigment of phthalocyanine. Particles no. 5=ALTIRIS® 550 complexed with red organic pigments of toluidine.

TABLE 2

Type of particles of intermediate diameter

| Particle type | particle size | No. |
|---|---|---|
| Hybrid pigments of type "Mayan" blue | 1μ-2μ | 1 |
| Hybrid pigments of type "Mayan" red | 1μ-2μ | 2 |
| Hybrid pigments of type "Mayan" yellow | 1μ-2μ | 3 |
| Solar IR-reflecting pigment ALTARIS 800 nm + organic blue pigment | 700 nm-900 nm | 4 |
| Solar IR-reflecting pigments ALTARIS 550 nm + organic red pigment | 500 nm-600 nm | 5 |

The examples of concentrates of particles of intermediate diameter are summarized in Table 3 below, with copolymers no. 1 to 11 of Example 1.

TABLE 3

Particle concentrates

| | A | B | C | D | E | F | G | H |
|---|---|---|---|---|---|---|---|---|
| Water % | | | | | | | | |
| | 29 | 29 | 29 | 29 | 29 | 29 | 29 | 29 |
| Copolymer | No. 1 | No. 2 | No. 3 | No. 4 | No. 5 | No. 6 | No. 7 | No. 8 |
| % | 25 | 25 | 25 | 25 | 25 | 25 | 25 | 25 |
| Particle | No. 1 | No. 1 | No. 1 | No. 1 | No. 1 | No. 1 | No. 1 | No. 1 |
| % | 45 | 45 | 45 | 45 | 45 | 45 | 45 | 45 |
| Antifoam + bactericide | 1 | 1 | 1 | 1 | 1 | 1 | 1 | 1 |
| Rheology | 12 | 12 | 35 | 40 | 10 | 27 | 62 | 10 |
| Stability | 1 | 1 | 1 | 1 | 3 | 2 | 1 | 3 |
| Compatibility | 1 | 1 | 1 | 1 | 3 | 2 | 1 | 3 |

Weight %

| | I | J | K | L | M | N |
|---|---|---|---|---|---|---|
| Water % | | | | | | |
| | 29 | 29 | 29 | 29 | 29 | 29 |
| Copolymer | No. 9 | No. 10 | No. 11 | No. 8 | No. 8 | No. 8 |
| % | 25 | 25 | 25 | 25 | 25 | 25 |
| Particle | No. 1 | No. 1 | No. 1 | No. 2 | No. 4 | No. 5 |
| % | 45 | 45 | 45 | 45 | 45 | 45 |
| Antifoam + bactericide | 1 | 1 | 1 | 1 | 1 | 1 |
| Rheology (P) | 25 | 58 | 36 | 15 | 9 | 11 |
| Stability | 2 | 1 | 2 | 3 | 3 | 3 |
| Compatibility | 2 | 2 | 2 | 3 | 3 | 3 |

Rheology: It is measured using a rheometer at 500 $s^{-1}$, at 20° C. and expressed in poises (P). It is good between 8 and 15 P.

Stability test:

Scale used in the tables:

3—good

2—satisfactory

1—poor

The stability test is performed on the concentrates of particles of intermediate diameter but also on paints containing them.

This test is performed on a sample of concentrate of particles of intermediate diameter which is placed in an oven at 50° C. for 3 weeks. Three 200-ml containers are prepared and inspected before being placed in the oven.

At the end of each week, a container was taken out of the oven and, after being left overnight for its temperature to stabilize (at room temperature), the following inspections were made to analyse whether its stability was good or not:

Verification of the concentrate of particles of intermediate diameter in the container: presence or absence of surfacing (syneresis) or of settling (presence of a deposit at the bottom of the container, whether hard, soft, large or not).

Measurement of viscosity and comparison relative to the control before oven-heating: analysis to check whether the product has fluidified, thickened or hardened.

These observations and measurements are made after 1, 2 and 3 weeks; based on the various analyses, the concentrate of particles of intermediate diameter is rated on the scale above.

Compatibility test:

Scale used in the tables: 3=good, 2=satisfactory, and 1=poor

The compatibility test is intended to verify the physico-chemical behaviour of the concentrate of particles of intermediate diameter in paints, liquid coatings, liquid inks and liquid formulations for coating.

After mixing with a disc mixer, at a speed of about 600 rpm, the mixture is analysed:
- Observation of the mixture: presence of agglomerates, phase separation, sedimentation, etc.
- Measurement of viscosities,
- Application, with a 100μ calibrated applicator, onto a substrate commonly used for paint, ink, coating, contrast card, to check the transparency of the deposited film when wet and then when dry after drying,
- Verification of the characteristics of the dry film: opacity, colour, gloss.

Based on this analysis, the concentrate of particles of intermediate diameter is rated, according to the scale above, substantially compatible.

From these results, it arises that it is possible to obtain a concentrate of particles of intermediate diameter having good rheology and good or satisfactory compatibility and stability properties only for the copolymers comprising two types of monomers in the anchor sequence, in accordance with the present invention, namely copolymers 5, 6 and 8 to 11.

Furthermore, the copolymers with hydrophobic sequences obtained with (EHMA) macromers and hydrophilic sequences obtained with PPGEGMA 750 and MPEGMA 550 macromers have the best stabilities and compatibility (copolymers 5 and 8)

EXAMPLE 3: PREPARATION OF PAINTS CONTAINING A CONCENTRATE OF PARTICLES OF THE INVENTION

A) an aqueous paint is prepared by adding and mixing each concentrate of particles of intermediate diameter in a pastel (P) or transparent (TR) base paint according to use, using a gyroscopic agitator. The characteristics of the paints are checked by measuring the following parameters for the liquid paint: density, weight content of the dry extract, viscosity and stability. The results are rated: 3=good; 2=satisfactory and 1=poor in Table 4.

TABLE 4

Paints containing a concentrate of particles

| Paint no. | 1 | | | | | 2 | 3 | 4 | 5 |
|---|---|---|---|---|---|---|---|---|---|
| P base % | 95 | 95 | 95 | 95 | 95 | 95 | 95 | 95 | 95 |
| TR base % | | | | | | | | | |
| Concentrate of particles | A | B | E | F | G | H | L | M | N |
| % | 5 | 5 | 5 | 5 | 5 | 5 | 5 | 5 | 5 |
| Results | 1 | 1 | 2 | 1 | 1 | 3 | 1 | 3 | 3 |

The best results are obtained with the concentrates containing copolymer no. 8.

The compositions of the P (pastel) base and of the TR (transparent) base are presented in Table 5 below in which the values are weight proportions expressed as a percentage.

TABLE 5

| PASTEL BASE | | TRANSPARENT BASE | |
|---|---|---|---|
| 5.500 | WATER | 5.500 | WATER |
| 38.900 | FINE CARBONATE | 38.900 | FINE CARBONATE |
| 30.000 | UCAR LATEX DL | 30.000 | UCAR LATEX DL |
| 0.800 | COAPUR W | 0.800 | COAPUR W |
| 22.000 | MOWILITH LDM | 22.000 | MOWILITH LDM |
| 0.400 | ACRYSOL DR | 0.400 | ACRYSOL DR |

TABLE 5-continued

| PASTEL BASE | | TRANSPARENT BASE | |
|---|---|---|---|
| 0.150 | PREVENTOL | 0.150 | PREVENTOL |
| 0.200 | DEA | 0.200 | DEA |
| 1.700 | NEXCOA.NX | 1.700 | NEXCOA.NX |
| 0.100 | CALGON N | 0.100 | CALGON N |
| 0.250 | BYK 023 | 0.250 | BYK 023 |

B) Two other types of paints are prepared with aqueous concentrates and organics solvents, respectively.

| Aqueous paint | Solvent paint |
|---|---|
| Water | Aliphatic, aromatic, isoparaffinic solvents |
| Aqueous binder: vinyl and/or acrylic latex | Solvent binders: alkyds, glycerophthalics |
| Aqueous filler modules | Solvent or universal filler modules |
| Additives: bactericides, antifoam, rheology agent | Additives: rheology agent, drying agent and plasticizer |
| Dyes | Dyes |

The modular components are all liquids and therefore can be stored in tanks, pumped, automatically measured and easily mixed.

A paint can therefore be manufactured quickly and economically.

The procedure for manufacturing modular paints, which can be applied to all weight or volume combinations of the various liquid components, comprises the following successive steps:

1—placing the various components in a tank

2—placing the tank under a variable-speed agitator with a mixing screw suitable for liquid mixtures in relation to the size of the tank, with a mixing time of about 20 minutes at a speed of 700 rpm. The mixture can also be made with a vibration type agitator using 1- to 20-litre containers into which the various liquid components have been measured out. The mixture is prepared after closing the lid and shaking the container with the agitator for about 5 minutes.

3—The characteristics of the paints are checked by measuring the following parameters:

For the liquid paint:
Density (g/cm$^3$)
Dry extract
Viscosities
Stability

For the dry film:
Colorimetric coordinates
Opacity
Surface gloss

The formulas of the prepared paints are presented in Table 5.

The best results are obtained with the concentrates comprising copolymers no. 5 and 8.

The invention claimed is:

1. A liquid concentrate of pigments of mineral and organic hybrid solid particles of 0.5 to 2 μm, useful for the manufacture of paints comprising an aqueous or organic solvent, comprising a grafted copolymer containing at least three sequences of different chemical nature, among which at least one anchor sequence capable of being absorbed on solid particles, at least one hydrophobic sequence, and at least one hydrophilic sequence, wherein said copolymer consists of:

1) 5 to 40 wt %, of said anchor sequence(s) consisting of a linear copolymer formed from at least two different monomer units comprising:
a) a first monomer with at least one basic nitrogenous group added from one or more compound(s) selected from the vinylpyridines and aminoalkyl(meth)acrylate of formula I:

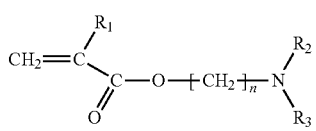

where $R_1$ is a hydrogen atom or a (C1-C4) alkyl radical; $R_2$ and $R_3$, which may be identical or different, are each a hydrogen or a (C1-C4) alkyl radical, n=0 to 6, and
b) a second monomer of the anchor sequence consists of a monomer of formula II:

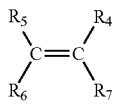

wherein:
$R_4$, $R_5$, $R_6$ are identical or different and are each a hydrogen or a C1-C4 alkyl radical,
$R_7$ is an aromatic group comprising an optionally substituted phenyl group,
the weight content of said first monomer relative to said second monomer being between 40 and 60 wt %, and
2) 25 to 90 wt % of said hydrophobic sequence(s) obtained from a macromonomer of formula (III):

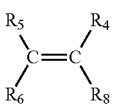

wherein:
$R_4$, $R_5$, $R_6$ are identical or different and are each a hydrogen or a C1-C4 alkyl radical, and
$R_8$ consists of a polymer whose monomer units contain —$COOR_{10}$ groups in which $R_{10}$ is an optionally substituted C1-C10 alkyl, and
3) 5 to 70 wt % of hydrophilic sequence(s) obtained from a macromonomer of formula (IV):

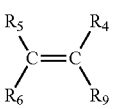

$R_4$, $R_5$, $R_6$ are identical or different and are each a hydrogen or a C1-C4 alkyl radical, and
$R_9$ is a hydrophilic sequence comprising a polyethylene glycol sequence (a) substituted by a terminal alkoxy group or (b) connected to a polypropylene glycol sequence.

2. The liquid concentrate of pigments of hybrid solid particles according to claim 1, wherein said hybrid solid particles comprise mineral particles having a hollow or porous structure, filled with organic dye pigments.

3. The liquid concentrate of pigments of hybrid solid particles according to claim 1, wherein the hydrophilic sequence $R_9$ is obtained from a macromonomer of polypropylene glycol-ethylene glycol methacrylate, $R_9$ being a polypropylene glycol sequence substituted by a terminal polyethylene glycol sequence.

4. The liquid concentrate of pigments of hybrid solid particles according to claim 1, wherein said hydrophilic sequence is obtained from a macromonomer of methoxy polyethylene glycol methacrylate, $R_9$ being a hydrophilic sequence comprising a polyethylene glycol sequence substituted by a terminal methoxy group.

5. The liquid concentrate of pigments of hybrid solid particles according to claim 1, wherein, in said anchor sequence, said first monomer is 2-dimethylaminoethyl methacrylate monomer and said second monomer is styrene.

6. The liquid concentrate of pigments of hybrid solid particles according to claim 1, wherein said hydrophobic sequence is obtained from a polymer macromonomer of ethylhexyl methacrylate units.

7. The liquid concentrate of pigments of hybrid solid particles according to claim 1, wherein the molecular weight of the grafted copolymer is between 5,000 and 25,000.

8. The liquid concentrate of pigments of hybrid solid particles according to claim 1, wherein said copolymer comprises:
a said hydrophilic sequence obtained from a macromonomer of polypropylene glycol-ethylene glycol methacrylate, or a macromer of methoxy polyethyleneglycol methacrylate,
a said anchor sequence obtained with a said first monomer which is 2-dimethylaminoethyl methacrylate monomer and said second monomer which is styrene; and
a said hydrophobic sequence obtained from a macromonomer of methacrylate polymer of ethylhexyl.

9. The liquid concentrate of pigments of hybrid solid particles according to claim 1, comprising an aqueous solvent.

10. The liquid concentrate of pigments of hybrid solid particles according to claim 1, comprising a dry extract of pigments of hybrid solid particles greater than or equal to 45%.

11. The liquid concentrate of pigments of hybrid solid particles according to claim 1, wherein the weight content of the dry extract of said grafted copolymers is from 10 to 30 wt % of said liquid concentrate.

12. The liquid concentrate of pigments of hybrid solid particles according to claim 1, wherein a relative weight proportion of organic molecules of dyes in said pigments of hybrid solid particles is from 1 to 45 wt %.

13. The liquid concentrate of pigments of hybrid solid particles according to claim 1, wherein said copolymer consists of:
15 to 35 wt % of said anchor sequence(s),
40 to 80 wt % of said hydrophobic sequence(s), and
15 to 30 wt % of hydrophilic sequence(s).

14. The liquid concentrate of pigments of hybrid solid particles according to claim 1, wherein $R_{10}$ is a C2-C8 alkyl which can be optionally hydroxyl-substituted.

15. The liquid concentrate of pigments of hybrid solid particles according to claim 1, wherein the hydrophilic sequence $R_9$ is obtained from a macromonomer of polypropylene glycol-ethylene glycol methacrylate of molecular weight of 500 or higher.

16. The liquid concentrate of pigments of hybrid solid particles according to claim 2, wherein said hybrid particles comprise clay mineral particles in the form of hollow fibres called sepiolite, inside which fibres of organic dye pigments of plant origin are added.

17. The liquid concentrate of pigments of hybrid solid particles according to claim 2, said hybrid solid particles comprise mineral particles having a hollow or porous structure, filled with organic dye pigments with a relative weight proportion of organic dye pigments in said pigments of hybrid solid particles of 1 to 30 wt %.

18. The liquid concentrate of pigments of hybrid solid particles according to claim 1, wherein said hybrid particles comprise particles of complexes of infrared (IR)-radiation-reflecting pigments complexed with organic molecules of dyes.

19. The liquid concentrate of pigments according to claim 18, wherein said hybrid particles comprise particles of complexes of infrared (IR)-radiation-reflecting pigments complexed with organic molecules of dyes with a relative weight proportion of organic dye molecules in said pigments of hybrid solid particles of 1.5 to 15 wt %.

20. The liquid concentrate of pigments of hybrid solid particles according to claim 18, wherein said particles of complexes of infrared (IR)-radiation-reflecting pigments comprise white metallic oxides, or black metallic oxides.

21. The liquid concentrate of pigments according to claim 20, wherein said particles of complexes of infrared (IR)-radiation-reflecting pigments comprise white metallic oxides consisting in the titanium dioxide of crystalline form known as rutile, or black metallic oxides consisting in chromium oxide.

22. A process for preparing paint, comprising:

mixing a liquid concentrate of pigments of hybrid solid particles according to claim 1 with other components of the paint.

\* \* \* \* \*